United States Patent
Chen et al.

(10) Patent No.: US 9,294,791 B2
(45) Date of Patent: Mar. 22, 2016

(54) METHOD AND SYSTEM FOR UTILIZING SWITCHED DIGITAL VIDEO (SDV) FOR DELIVERING DYNAMICALLY ENCODED VIDEO CONTENT

(75) Inventors: Xuemin Chen, Rancho Santa Fe, CA (US); Marcus Kellerman, San Diego, CA (US); Vladimir Silyaev, Laguna Niguel, CA (US); David Erickson, San Clemente, CA (US)

(73) Assignee: BROADCOM CORPORATION, Irvine, CA (US)

( * ) Notice: Subject to any disclaimer, the term of this patent is extended or adjusted under 35 U.S.C. 154(b) by 670 days.

(21) Appl. No.: 12/650,069

(22) Filed: Dec. 30, 2009

(65) Prior Publication Data

US 2011/0162027 A1 Jun. 30, 2011

Related U.S. Application Data

(60) Provisional application No. 61/261,780, filed on Nov. 17, 2009.

(51) Int. Cl.
*H04N 21/239* (2011.01)
*H04N 21/24* (2011.01)
*H04N 21/6405* (2011.01)

(52) U.S. Cl.
CPC ....... *H04N 21/2393* (2013.01); *H04N 21/2402* (2013.01); *H04N 21/6405* (2013.01)

(58) Field of Classification Search
USPC .................................................. 725/109–112
See application file for complete search history.

(56) References Cited

U.S. PATENT DOCUMENTS 7,770,200 B2 * 8/2010 Brooks et al. ................... 725/95
2001/0056460 A1 * 12/2001 Sahota et al. ................. 709/201

* cited by examiner

*Primary Examiner* — Mulugeta Mengesha
(74) *Attorney, Agent, or Firm* — Foley & Lardner LLP; Joseph N. Ziebert; Helen H. Zhang

(57) ABSTRACT

A server may be used to handle at least some of processing of content that is based on web access operations initiated in a set-top box (STB), wherein one or more links between the server and the STB that are used to forward multimedia broadcasts are configured to free bandwidth for communicating at least a portion of the processed content to the STB. The bandwidth may be freed based on switched digital video (SDV) and/or dedicated IPTV channels or systems. The broadcast links may be reconfigured based on monitoring of multimedia broadcast access by the STB and/or one or more other STBs. The freed bandwidth in the multimedia broadcast links may be configured for unicast transport of processed content to a specific STB, or may be configured for multicast transport of the processed content to a plurality of STBs.

20 Claims, 5 Drawing Sheets

US 9,294,791 B2

METHOD AND SYSTEM FOR UTILIZING SWITCHED DIGITAL VIDEO (SDV) FOR DELIVERING DYNAMICALLY ENCODED VIDEO CONTENT

CROSS-REFERENCE TO RELATED APPLICATIONS/INCORPORATION BY REFERENCE

This patent application makes reference to, claims priority to and claims benefit from U.S. Provisional Patent Application Ser. No. 61/261,780, filed Nov. 17, 2009. This application also makes reference to:

U.S. patent application Ser. No. 12/650,145 filed on Dec. 30, 2009;
U.S. patent application Ser. No. 12/650,141 filed on Dec. 30, 2009;
U.S. patent application Ser. No. 12/650,140 filed on Dec. 30, 2009;
U.S. patent application Ser. No. 12/649,971 filed on Dec. 30, 2009;
U.S. patent application Ser. No. 12/650,067 filed on Dec. 30, 2009;
U.S. patent application Ser. No. 12/650,020 filed on Dec. 30, 2009;
U.S. patent application Ser. No. 12/650,171 filed on Dec. 30, 2009;
U.S. patent application Ser. No. 12/649,998 filed on Dec. 30, 2009.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for utilizing Switched Digital Video (SDV) for delivering dynamically encoded video content.

BACKGROUND OF THE INVENTION

With the continuous growth of on-line businesses, social networks, and other on-line services and applications, a user may want a larger number of places or locations from which to access the Internet in a manner that is flexible and/or suits the user's lifestyle. Most users currently connect to the Internet using a web browser running on a personal computer. While only a portion of homes have a computer, most homes have a television, and in many instances, multiple televisions. Therefore, rather than using a computer to access the Internet, a user may find it more convenient to use the flat screen televisions and/or monitors in homes for the same purpose. To do so, a set-top-box (STB) connected to, for example, a flat screen television may be provided with web browsing software and protocols, and Internet connectivity, which may enable the user to easily access the Internet or check their electronic mail (email), for example, from a convenient and comfortable location such as their living room.

There may be instances, however, in which the STB may not be configured to support and/or capable of processing certain content in a web page. Moreover, there may be instances in which the latency associated with rendering or displaying certain content in a web page may be long because of the processing capabilities of the STB. This may affect the overall experience of the user.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing dedicated video transport channels and systems (e.g. SDV or dedicated IPTV channels and systems) for delivering dynamically encoded multimedia content, comprising, for example, Internet video, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing dedicated video transport channels and systems, such as Switched Digital Video (SDV) or IPTV channels and systems, for delivering dynamically encoded Internet multimedia content, such as Internet video. In various embodiments of the invention, a server may be operable to handle at least some of the processing of content for web initiated access operations in a set-top box (STB). The plurality of broadcast links between the server and the serviced STB, which are used to forward multimedia broadcasts, are configured to free bandwidth for communicating at least a portion of the processed content. Exemplary multimedia broadcasts comprise cable television (CATV) broadcasts and Internet Protocol television (IPTV) broadcasts. The processing handled in the server may comprise converting content that is unsupported via the STB to video content that is supported via the STB. For example, the bandwidth may be freed using switched digital video (SDV) for the channels, which are utilized for communication of the multimedia broadcasts that are unwatched and/or infrequently utilized. The broadcast links may be reconfigured based on monitoring of multimedia broadcast access by the STB and/or one or more other STBs. The freed bandwidth in the broadcast links may be configured for unicast transport of processed content to a specific STB, or may be configured for multicast transport of the processed content to a plurality of STBs.

Resources and/or applications used in the server during the processing are based on the configuring of the plurality of broadcast links. Furthermore, the resources and/or applications may be reconfiguring based on changes in freed bandwidth in the plurality of broadcast links. Some of the resources and/or applications may support encoding video content generated based on content processing handled in the server, and the video encoding may be dynamically modified based on changes in the freed bandwidth in the plurality of broadcast links based on changes in the freed bandwidth in the plurality of broadcast links.

Figure 1A:
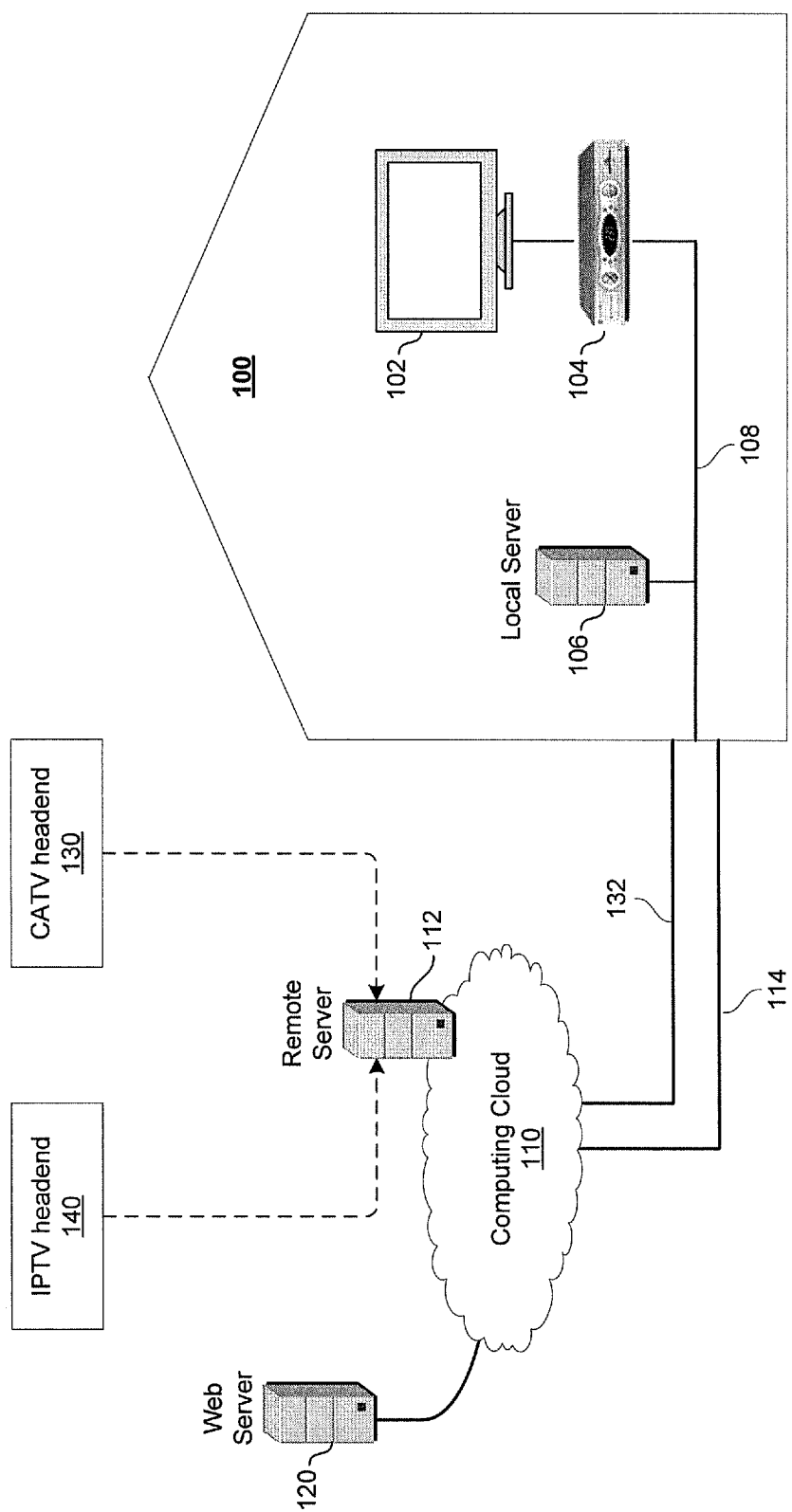
FIG. 1A is a block diagram illustrating an exemplary system that provides offloaded content processing by support servers during web access via a set-top-box (STB), in accordance with an embodiment of the invention.

FIG. 1A is a block diagram illustrating an exemplary system that provides offloaded content processing by support servers during web access via a set-top-box (STB), in accordance with an embodiment of the invention. Referring to FIG. 1A, there is shown a location 100 within which may be disposed a television 102, an STB 104, a local support local server 106, and a broadband connection 108. Also shown in FIG. 1A is a cable television (CATV) headend 130, an Internet Protocol television (IPTV) headend 140, and a computing cloud 110, which may coupled to the location 100 via a broadband connection 114, and a web server 120.

The location 100 may be a residence (e.g. home or apartment), a business, a school, a library, and/or other like setting in which a user may want to access the Internet and/or check their electronic mail (email). The position or placement of the television set 102, the STB 104, and/or the local support local server 106 within the location 100 may be based on user convenience and/or lifestyle. For example, when location 100 is a residence, the television set 102 and the STB 104 may be located in a bedroom, a family room, or an entertainment room. In another example, when location 100 is a business or a public building, the television set 102 and the STB 104 may be located in a conference room. The local support local server 106 may be located nearby (for example, in the same room) the television set 102 and the STB 104 or may be located remotely (for example, in another room or nearby building) from the television set 102 and the STB 104. The broadband connection 108 may provide a wired connection that communicatively couples two or more devices within the location 100 utilizing, for example, coaxial cables. In addition to wired connectivity, a portion of the broadband connection 108 may also provide wireless connectivity between two or more devices within the location 100, utilizing, for example, WiFi links.

The television set 102 may comprise suitable logic, circuitry, code, and/or interfaces that may be operable to receive signals from which to display images (for example, moving images) that are typically accompanied by sound. The television 100 may be based on, for example, cathode ray tube (CRT) technology, plasma technology, liquid crystal display (LCD) technology, and/or light emitting diode (LED) backlit LCD technology. The television set 102 may be operable to support one or multiple technical standards such as digital television (DTV) and high-definition television (HDTV), for example. The resolution of the screen or display portion of the television set 102 may be based on the technical standard supported by the television set 102. For example, for HDTV, the resolution of the screen may be 720p, 1080i, or 1080p, where the numeral indicates the vertical resolution of the screen, the letter "p" refers to progressive-scan format, and the letter "i" refers to interlaced-scan format.

The STB 104 may comprise suitable logic, circuitry, code, and/or interfaces that may be operable to connect the television set 102 to an external source of signals, and/or may be operable to convert those signals into content that may be displayed, for example, by the television set 102. The STB 104 may also be operable to provide processing associated with managing, delivering, and/or storing video content that may be displayed on the television set 102. In an exemplary aspect of the invention, the STB 104 may be operable to run a web browser that may be displayed on the screen of the television set 102, for user interaction. A web browser is typically a software application that may enable a user to retrieve, present, or review information resources available on, for example, the World Wide Web ("the Web"). An information resource may comprise a web page, an image, video, text, graphics, and/or other type of multimedia content, for example. A web browser may also be utilized to access information that is provided by web servers in private networks and/or files in file systems. Examples of web browsers may comprise Internet Explorer, Mozilla Firefox, Apple Safari, Google Chrome, Opera, and/or browsers that may be native or custom-made for the STB 104.

Information resources may be brought to the user via the web browser when the user inputs a Uniform Resource Identifier (URI) into the web browser. In this regard, the prefix of the URI may be utilized to determine how to interpret the URI. For example, a URI that starts with "http:" may identify a resource to be retrieved over Hypertext Transfer Protocol (HTTP). Other prefixes that may be supported include "https:" for HTTP Secure (HTTPS), "ftp:" for the File Transfer Protocol (FTP), and "file:" for local files, for example. A Uniform Resource Locator (URL) is typically a subset of the URI that specifies the location where an information resource is available for retrieval and/or the mechanism for retrieval. Once the information resource has been retrieved, the web browser may be operable to display it. For example, HyperText Markup Language (HTML) may be passed to a layout engine in the web browser to be transformed from markup representation to an interactive document. In addition to HTML, web browsers may display different types of content on a web page. For example, web browsers may display images, audio, video, and/or Extensible Markup Language (XML) files, and often comprise and/or support certain plug-ins for, for example, Flash applications and/or Java applets. In one embodiment of the invention, in instances when a file of an unsupported type or a file that is set up to be downloaded rather than displayed is encountered, the browser may prompt the user to save the file to fixed and/or removable memory storage, for example, a memory in the set-top-box. In another embodiment of the invention, the web browser may present one or more requests to the local support local server 106 or to a server in the computing cloud 110 to assist with handling at least a portion of the unsupported content.

The local support local server 106 may comprise suitable logic, circuitry, code, and/or interfaces that may be operable support at least some of the processing otherwise required by the STB 104. In this regard, the local support local server 106 may run and/or execute certain software applications that may be accessible from the STB 104 via the broadband connection 108. For example, the local support local server 106 may be operable to provide support to the web browsing operations provided by the STB 104. The local support local server 106 may be implemented in a computing device, comprising for example a personal computer, laptop, tablet; and/or in a networking device, comprising for example, a router, which may provide processing capabilities that are sufficient for performing particular software applications. For example, in instances when the local support local server 106 is utilized to support web browsing operations in the STB 104, the processing capabilities in the local support local server 106 may be sufficient to run or execute software applications that provide such support.

The computing cloud 110 may comprise a plurality of servers and/or computing devices associated with providing various services offered by the Internet. In this regard, the term 'cloud' typically refers to the Internet and is based on the graphical depiction of the Internet as a cloud in computer network diagrams to represent the underlying infrastructure of the Internet. The servers in the computing cloud 110 may be utilized to provide reliable services that may be delivered through individual servers and/or data centers, for example. The computing cloud 110 may appear, to a user or to a location (for example, location 100), as a single point of access to services and/or resources that may be provided by the computing cloud 110. The servers in the computing cloud 110 may comprise, for example, applications servers that may be dedicated to running certain software applications and/or web servers (e.g. the web server 120) to which HTTP clients may connect to send commands and receive responses along with data content. For example, a remote server 112, in the computing cloud 110 may be utilized to support web browsing operations in the STB 104, performing substantially similar tasks and/or services that otherwise performed by the local server 106. In such instances, the remote server 112 in the computing cloud 110 may have processing capabilities sufficient to run or execute software applications that provide such support.

The server 112 may also be referred to as a render server or an STB assistance server, for example, to indicate that the remote server 112 may be operable to assist the STB 104 to render web content. Whether the remote server 112 in the computing cloud 110 or the local server 106 is utilized to support web browsing operations in the STB 104 may depend, at least in part, on the amount of latency that may be acceptable to a user when having web browsing operations in the STB 104, such as the rendering of a web page, for example, be supported or assisted by another resource. In this regard, a local resource (for example, the local server 106) may have lower latency than a remote resource (for example, the remote server 112 in computing cloud 110). Whether the remote server 112 in the computing cloud 110 or the local server 106 is utilized to support web browsing operations in the STB 104 may also depend on, for example, availability of the local server 106, available resources on the local server 106, and/or the processing capabilities and the type of support that may be provided by the remote server 112.

The remote server 112 need not be physically collocated with a web server. Accordingly, in some embodiments of the invention, the remote server 112 may be situated in a different location from the web server. The broadband connection 114 may provide connectivity between the computing cloud 110, and/or devices therein, and serviced users and/or location, such as location 100. In this regard, the broadband connection 114 may utilize wired connectivity that communicatively couples one or more devices in the computing cloud 110, and/or devices therein (e.g. the remote server 112), with serviced locations (e.g., location 100), utilizing, for example, coaxial cables. The broadband connection 114, or a portion thereof, may also be provided utilizing wireless connectivity utilizing, via, WiFi and/or WiMax links.

The web server 120 may comprise suitable logic, circuitry, code, and/or interfaces that may be operable to deliver to a client (for example, the STB 104) web pages (for example, HTML documents) and associated content (for example, images, style sheets, JavaScripts). When a client requests a specific information resource using HTTP, the web server 120 may respond by providing the content associated with that information resource. A full implementation of HTTP may enable the web server 120 to receive content from a client.

The CATV headend 130 may comprise suitable circuitry, logic, code, and/or interfaces that may enable broadcast of cable television. In this regard, the CATV headend 130 may be operable to communicate analog and/or digital formatted signals carrying, for example, a plurality of CATV channels. Broadcasts from the CATV headend 130 may be carried via one or more distribution networks, each of which may be operable to convey or forward content from the CATV headend 130 to a plurality of cable-TV subscribers, comprising, for example, location 100. Exemplary distribution networks may comprise fiber-optics based networks and/or coaxial cable based networks that may provide connectivity between one or both of the CATV headend 130 and the location. For example, at least a portion of the computing cloud 110 may be utilized as a distribution network for communicating CATV broadcasts from the CATV headend 130 to the location 100. In this regard, the remote server 112 may be utilized, for example, to receive CAW broadcast and forward them to plurality of locations, including location 100, via a dedicated CAW connection 132.

The Internet Protocol Television (IPTV) headend 140 may comprise suitable circuitry, logic, code, and/or interfaces that may provide multimedia/TV broadcasts over broadband connections. In this regard, the IPTV headend 140 may communicate TV broadcasts via a system of interconnected networks that enable exchange of data and/or information among a plurality of nodes, based on one or more networking standards, such as TCP/IP. TV broadcasts from the IPTV headend 140 may be carried via, for example, a plurality of broadband capable networks or sub-networks, which may comprise, satellite networks, cable networks, DVB networks, the Internet, and/or other local or wide area networks, which collectively may enable messaging and/or traffic carrying TV content to a plurality of IPTV subscribers, including, for example, location 100, via the broadband connection 114.

In operation, a user may decide to access a web page via a web browser in the STB 104 that is being displayed in the television set 102 while comfortably sitting in his/her living room. The user may submit a URL to the web browser, which in turn sends a request for the information resource associated with that URL to a web server, such as the web server 120. The web server 120 may pass the HTML and/or related content or information associated with the URL to the STB 104. The STB 104 may perform a pre-fetch operation of the web page information provided by the web server 120 to determine the type of content (for example, supported or unsupported content) that is comprised within the web page. The STB 104 may be operable to perform the pre-fetch operation as a background process, for example. For example, the web browser in the STB 104 may not be capable of providing support for certain content (for example, binary plug-ins)

because such content is not native to the processor being utilized in the STB 104. For example, plug-ins that have been developed or coded for execution in an x86-based processor architecture may not be supported in a STB having a processor based on a Microprocessor without Interlocked Pipeline Stages (MIPS) architecture. In such instances, changing the set-top-box design and/or providing an emulator of the x86-based processor in the set-top-box may be prohibitive.

In instances when certain portions of the web page may not be supported by the web browser provided in the STB 104, the STB 104 may send one or more requests to a server that is operable to provide web browsing support to the STB 104. The unsupported portions may comprise, for example, sections requiring a plug-in. In this regard, the STB 104 may send requests via an upper link to the local server 106 and/or to the remote server 112 in the computing cloud 110. The request may comprise information regarding the URL associated with the unsupported content, the size of the unsupported content in the web browser, and/or events associated with the unsupported content. Once such information is received by the server providing web browsing support to the STB 104, the server may in turn request and obtain the unsupported content from the corresponding web server 120, may process the unsupported content, and may encode the processed content into a format that may be received by the STB 104. In one exemplary embodiment of the invention, the processed content may be encoded with a low latency encoder protocol such as H.264/Advanced Audio Coding (ACC). In this regard, the server providing web browsing support to the STB 104 may be operable to transcode or provide direct conversion from one encoding format to another encoding format. The transcoding may comprise changing the bitstream format of one file to another bitstream format without undergoing a decoding and re-encoding process.

The resulting audio and video (A/V) content produced at the server may then be streamed to the STB 104, which in turn decodes the A/V stream and renders the resulting information in the appropriate portion of the web page to composite the complete web page. The portions of the web page that are supported by the web browser in the STB 104 may be rendered before or concurrently with the information provided by the server. In other words, the data provided by the server may be sent to the STB 104 when needed to composite the complete page according to a predetermined approach or scheme. Once the user moves away from that particular web page, the server may terminate the jobs related to that web page.

The STB 104 may also be operable to have all web page content handled by server(s) providing web browsing support to the STB 104. In such embodiments, the support server(s) may receive the URL information associated with the web page from the STB 104 and may in turn request the contents of the web page from the web server 120. The server may then encode the information in a format that may be received by the STB 104 and may stream the A/V content to the STB 104 to composite the complete web page. Although the STB 104 with a broadband connection capability is illustrated in FIG. 1A for full internet experience, the invention may not be so limited. Accordingly, instead of the STB 104, the television set 102 itself with a broadband connection capability for full Internet experience may be supported without departing from the spirit and scope of various embodiments of the invention.

In an exemplary aspect of the invention, at least some of servers utilized to service STBs during, for example, web access operations, may be utilized to forward television broadcasts comprising, for example, CATV and/or IPTV. For example, the remote server 112 may be utilized to forward CATV broadcasts from the CATV headend 130 and/or IPTV broadcasts from the IPTV headend 140. In this regard, the remote server 112 may be operable to forward CATV broadcasts to a plurality of locations, including location 100, utilizing CATV connection 132. To further enhance web access servicing operations, support servers may utilize broadcast connections, such as the CATV connection 132, to transport processed content to serviced STBs. In this regard, the remote server 112 may utilize, for example, the CATV connection 132 to communicate at least a portion of the content processed for web access operations in the STB 104.

In various embodiments of the invention, the support servers may be operable to configure available broadcast links to free bandwidth that may be utilized to transport processed content during STB servicing operations. For example, in instances when the remote server 112 is utilized to forward CATV broadcasts from the CATV headend 130 to, inter alia, location 100; the remote server 112 may free bandwidth in the CATV connection 132. The freed bandwidth may then be utilized by the remote server 112 to communicate at least some of content processed in the remote server 112 for web access operation in the STB 104 to the STB 104 via the CATV connection 132. In this regard, the remote server 112 may utilize, for example, switched digital video (SDV) based techniques to enable freeing bandwidth in the CATV connection 132. In switched digital video (SDV) based infrastructures, number of channels that are determined to be unwatched and/or infrequently watched may be removed from the pool of available broadcast channel, thus freeing some bandwidth. This freed bandwidth may be utilized for the delivery of content resulting from web initiated accessed by the STB. Various techniques may be utilized to determine what channels are unwatched and/or are infrequently watched, including, for example, statistical analysis and/or be requiring subscribers to communicate channel request signals thus enabling tracking channel use. Similarly, bandwidth in broadband connections utilized for IPTV broadcasts, for example, may also be freed using dedicated IPTV channels and/or systems to facilitate delivery of encoded content resulting from, for example, web initiated access by the STB.

Figure 1B:
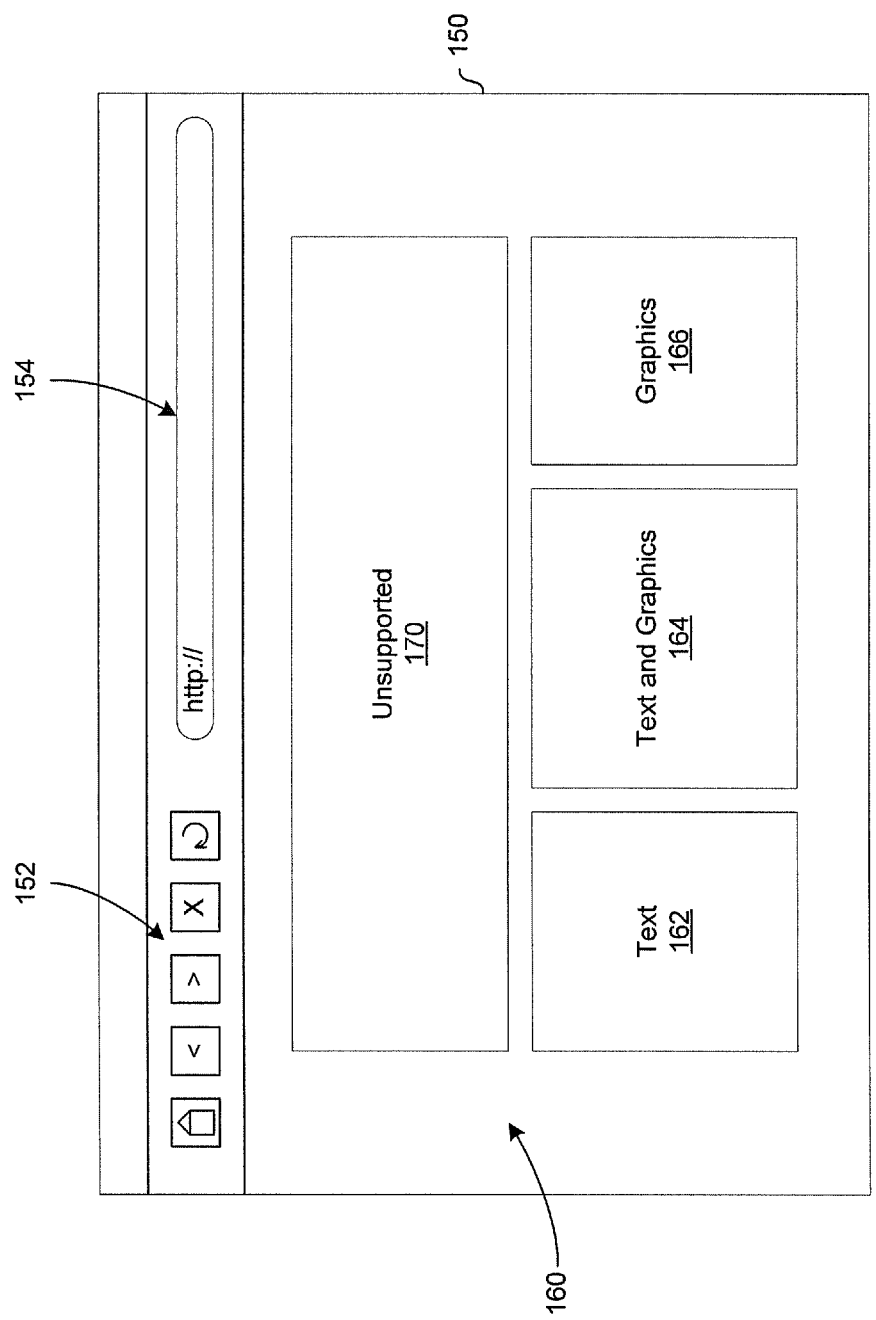
FIG. 1B is a block diagram illustrating an exemplary web page with multiple content types that is to be displayed by a local web browser in a set-top-box (STB), in accordance with an embodiment of the invention.

FIG. 1B is a block diagram illustrating an exemplary web page with multiple content types that is to be displayed by a local web browser in a set-top-box (STB), in accordance with an embodiment of the invention. Referring to FIG. 1B, there is shown a web browser 150 in which a web page 160 is to be displayed or rendered. The web browser 150 may comprise certain user interface elements 152 (for example, back, forward, reload, stop, home) that may be utilized for navigation and/or operation, and an address bar 154 that may be utilized to submit a URI.

The web page 160 to be displayed in the web browser 150 may comprise different types of contents. In the example illustrated in FIG. 1B, the web page 160 may comprise a text portion 162, a text and graphics portion 164, a graphics portion 166, and an unsupported (for example, plug-ins) portion 170. When the STB performs a pre-fetch operation to determine the types of content in the web page, it may determine that the unsupported portion 170 may be a portion of the web page for which the STB may need support from a sever. In this regard, the STB may identify the unsupported portion 170 to a server via a request for assistance. The server may then process the unsupported portion 170 and may subsequently provide the processed content associated with the unsupported portion 170 back to the STB in a format that the STB may utilize to composite the web page 160 in the web browser 150.

Figure 2:
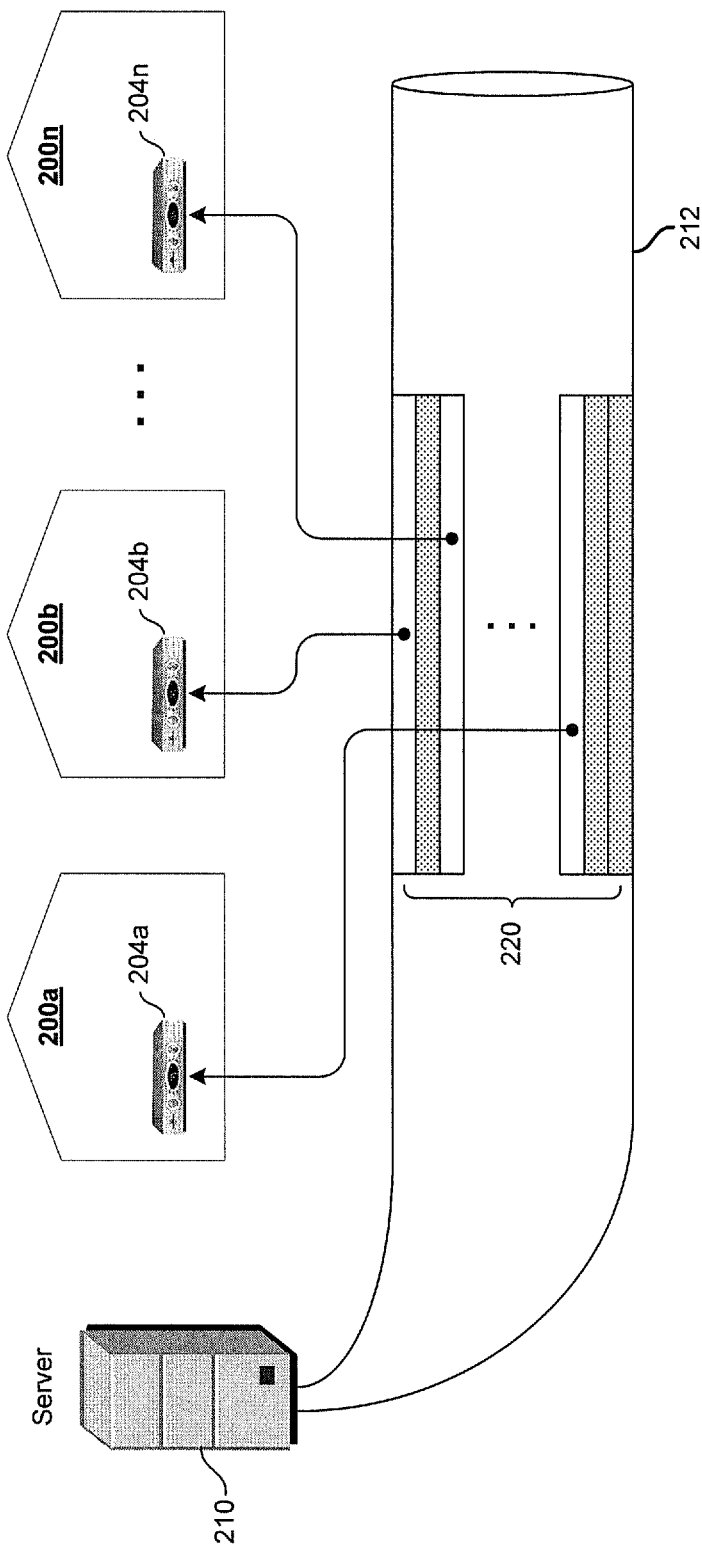
FIG. 2 is a block diagram illustrating an exemplary system that utilizes switched digital video (SDV) based architecture to free bandwidth, in accordance with an embodiment of the invention.

FIG. 2 is a block diagram illustrating an exemplary system that utilizes switched digital video (SDV) based architecture to free bandwidth, in accordance with an embodiment of the invention. Referring to FIG. 2, there is shown a plurality of locations 200a, 200b, ..., 200n, comprising a plurality of STBs 204a, 204b, 204n. Also shown in FIG. 2 is a server 210 that utilizes a connection 212 to communicate digital television broadcast that may comprise CATV broadcasts, which may comprise a plurality of CATV channels 220.

Each of the plurality of locations 200a, 200b, 200n may be similar to location 100, substantially as described with regard to, for example, FIG. 1A. In this regard, the plurality of locations 200a, 200b, ..., 200n may correspond to a plurality of CATV subscribers which may receive CATV broadcasts via the server 210, over the CATV connection 212. Each of the plurality of STBs 204a, 204b, ..., 204n may be similar to the STB 104, substantially as described with regard to, for example, FIG. 1A. In this regard, each of the plurality of STBs 204a, 204b, ..., 204n may enable reception of, for example, CATV broadcasts received from the server 210, via the CATV connection 212. In addition, at least some of the plurality of STBs 204a, 204b, ..., 204n may also support web access operations, for example, which may be serviced by the server 210, substantially as described with regard to FIG. 1A.

The server 210 may be similar to the remote server 112, substantially as described with regard to FIG. 1A. In this regard, the server 210 may comprise suitable circuitry, logic, code, and/or interfaces that may be operable to communicate CATV broadcasts to a plurality of subscribers via the CATV connection 212. The server 210 may also be operable to service web access operations performed in STBs.

In operation, the server 210 may be used within a CATV architecture to forward CATV broadcasts to subscribers. In this regard, the server 210 may receive CATV broadcasts from, for example, one or more instances of the CATV headend 130. The CATV broadcasts may be communicated to CATV subscribers, in the plurality of locations 200a, 200b, ..., 200n for example, via the CATV connection 212. The CATV broadcasts forwarded via the CATV connection may comprise the plurality of CATV channels 220. The plurality of CATV channels may comprise channels that are accessible by subscribers. In some instances, however, some of the channels in the plurality of CATV channels 220 may be accessible only by certain subscribers and/or at certain times, either as part of extra-cost packages (e.g. movie channels, such as HBO) or on individual, one-time use basis (e.g. video-on-demand and/or pay-per-view).

The server 210 may also be operable to service web access operations performed in one or more of the plurality of STBs 204a, 204b, ..., 204n. For example, the STB 204a in the location 200a may be utilized for web access operations, wherein one or more browsers may be run via the STB 204a. In this regard, the server 210 may be utilized to process at least some of the content of the web browser(s) run in the STB 204a, comprising, for example, content corresponding to unsupported plug-ins. The content processed via the server 210 may be communicated, for example, via a dedicated broadband connection (not shown) between the server 210 and the STB 204a.

In an exemplary aspect of the invention, however, at least some of the content processed via the server 210 may be transported via the CATV connection 220. In this regard, the processed content may be piggybacked, for example, on top of CATV broadcasts forwarded from the server 210 via the CATV connection, using available bandwidth. In various embodiments of the invention, bandwidth may be freed and/ or made available in broadcast links, such as the CATV connection 212, to facilitate transportation of processed content via the broadcast links during servicing of web access operations by the STBs. For example, the setup shown in FIG. 2, comprising the server 200 and the plurality of locations 200a, 200b, ..., 200n, may be implemented utilizing switched digital video (SDV). The use of switched digital video (SDV) may enable, for example, the us of variable delivery of content, wherein rather than combining all the channels that may be accessed by all the subscribers at any point into the broadcast stream throughout the network, only a subset of channels are utilized for conveying web initiated access content. For example, only the most popular channels or channels with high utilization (e.g., shown as un-shaded blocks within the CATV connection 212) are included in the regular, network-wide broadcast streams. The less popular channels or channels with utilization (shown as shaded blocks), comprising, for example, unused, unwatched, and/or are infrequently viewed channels are not included into broadcast stream, thus freeing bandwidth that would have otherwise been used for them. Furthermore, a portion of the broadcast stream may be allocated to and/or shared by the less popular channels, and time slots within that portion may be used only when one of the less popular channels is requested by a subscriber, for example. Similarly, in instances where the plurality of STBs 204a, 204b, ..., 204n may be operable to receive IPTV broadcasts, via the server 210 for example, bandwidth in broadband connections utilized for the IPTV broadcasts may be freed using dedicated IPTV channels and systems to facilitate delivery of content, encoded in the server 210 to support web initiated accessed by the STBs for example, substantially in similar manner to use of SDV described herein.

Various methods may be utilized to classify channels that may be carried via the broadcasts streams as popular/watched or unpopular channels. Providers may conduct, for example, statistical analysis, which may be repeated periodically to classify channels into various groups based on the viewership frequency. Unwatched and/or infrequently viewed channels may only be made available when requested, by the STB based on user input for example. Once the infrequently channels viewing is over (e.g. channel is changed), the infrequently used channel may be removed again from the broadcast stream. The providers may also maintain databases to track channel request to help classify channels as popular or unpopular channels. Furthermore, providers may also group subscribers into logical groups to enable adding channels, on per-request basis, only within a specific area rather than network-wide.

Once bandwidth is freed using SDV mechanisms, the free bandwidth may be utilized to communicate processed content during servicing of STB initiated web access operations. For example, bandwidth that would otherwise be allocated for less popular channels (e.g. unwatched channels and/or view-on-demand channels), may instead be allocated to transport of processed content from the server 210 to the STB 204a during web access operations via the STB 304a in the location 200a. The bandwidth used for transporting processed content may allocated as a dedicated channel so that only a specific subscriber may be able to access it. In this regard, built in functionality that support similar connectivity in CATV broadcast (e.g., pay-per-view) may be utilized to ensure that only the target user is able to receive the processed content. In some instances, a group of subscribers may be allowed to access the same processed content, to facilitate multicast transport of processed content. The SDV architecture may also allow switching of processed content, which may comprise A/V streams, into existing channels. For example, if the processed content comprises MPEG-4 encoded content, that content may be switched into existing CATV channels that may be MPEG-2 encoded using existing support infrastructure that is otherwise utilized to support dual-carry services in SDV based systems.

The CATV connection 212 may also be utilized to enable uplink connectivity, during web access operations in STBs serviced by the server 210. In this regard, existing uplink channels, that may be utilized to for communicating CATV subscribers' inputs and/or requests, may be utilized to facilitate communicating user's input and/or requests for web initiated access operations via the STBs. For example, messaging corresponding to mouse movement in a web browser running in STB 204a may be communicated via the CATV connection 212 to the server 210, and then to a web server (not shown) for example, using existing uplink channels in the CATV connection 212. Alternatively, uplink communication may be conducted over separate and dedicated broadband connection.

Figure 3:
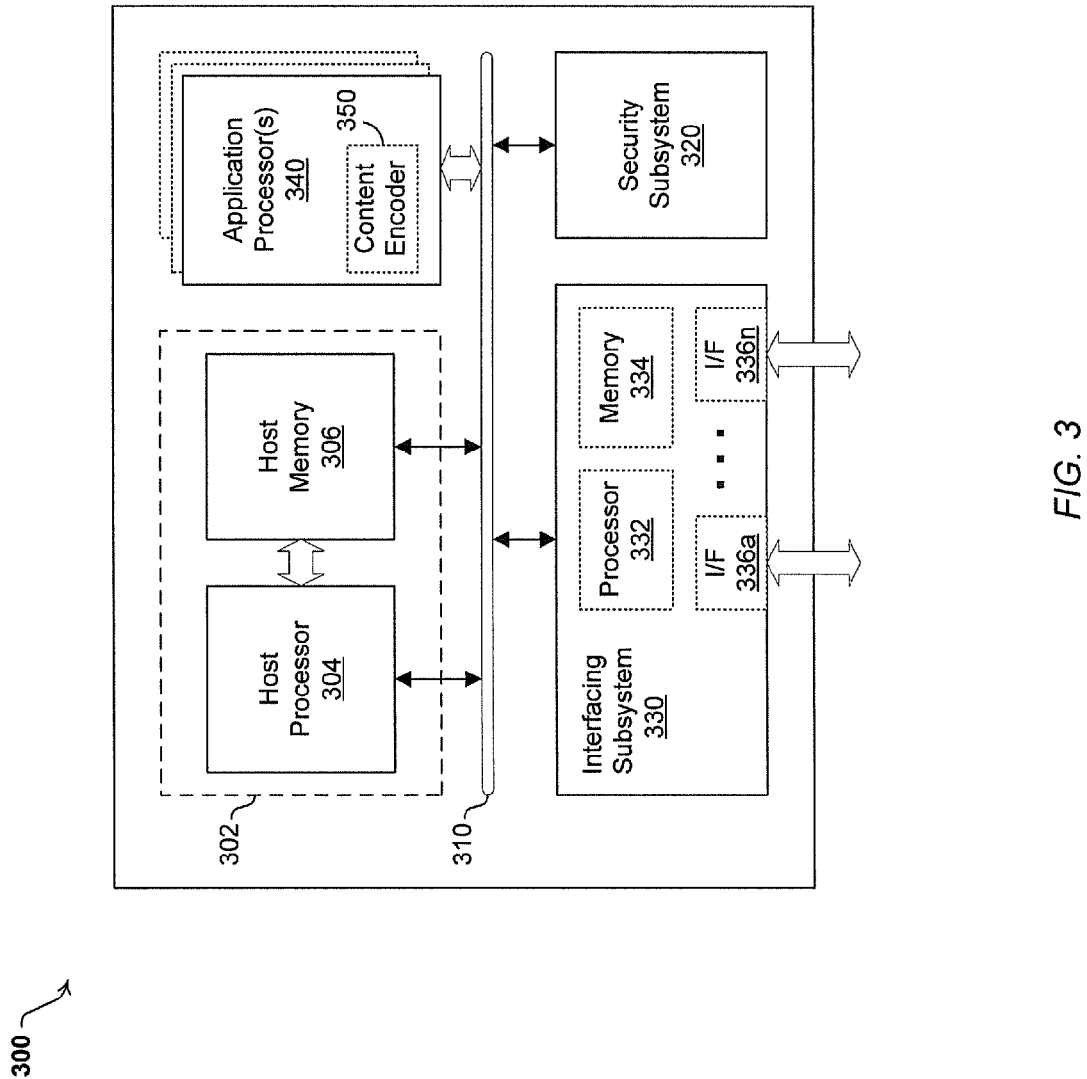
FIG. 3 is a block diagram illustrating an exemplary server that utilizes switched digital video (SDV) for delivering dynamically encoded video content during web browsing via a set-top-box (STB), in accordance with an embodiment of the invention.

FIG. 3 is a block diagram illustrating an exemplary server that utilizes switched digital video (SDV) for delivering dynamically encoded video content during web browsing via a set-top-box (STB), in accordance with an embodiment of the invention. Referring to FIG. 3, there is shown a server 300, a host system 302, a host processor 304, a host memory 306, a system bus 310, a security system 320, an interfacing system 330, an interfacing processor 332, an interfacing memory 334, a plurality of I/F modules 336a, . . . , 336n, and application processor 340.

The server 300 may be similar to the server 210, substantially as described with regard to FIG. 2. In this regard, server 300 may comprise suitable logic, circuitry, code, and/or interfaces that may be operable to support forwarding television broadcasts, such as CATV broadcasts, to a plurality of subscribers. The server 300 may also comprise suitable logic, circuitry, code, and/or interfaces that enable supporting web browsing operations external to set-top boxes (STBs). The server 300 may comprise, for example, the host system 302, the system bus 310, the security system 120, and/or the interfacing system 330. In an exemplary aspect of the invention, the server 300 may be utilize switched digital video (SDV) techniques to enable freeing bandwidth in broadcast based links, for example CATV forwarding connection, for transporting content processed during support of STB web access operations to the serviced STBs. The server 300 may also support using dedicated IPTV channels and/or systems to facilitate delivery of encoded content, substantially in similar manner to use of SDV.

The host system 302 may comprise suitable logic, circuitry, code, and/or interfaces that may be operable to control and/or manage operations of the server 300 and/or tasks or applications performed therein. The host system may comprise, for example, the host processor 304 and/or the host memory 306. The host processor 304 may comprise suitable logic, circuitry, interfaces and/or code that may be operable to process data and/or control operations of the server 300. In this regard, the host processor 304 may be operable to configure and/or control operations of various components and/or systems of the server 300, by providing, for example, control signals. The host processor 304 may also control data transfers within the server 300, during web browsing support operations, for example. The host memory 306 may comprise suitable logic, circuitry, interfaces and/or code that enable permanent and/or non-permanent storage and/or fetching of data, code and/or other information used in the server 300. In this regard, the host memory 306 may comprise different memory technologies, including, for example, read-only memory (ROM), random access memory (RAM), and/or Flash memory. The host memory 306 may store, for example, information comprising configuration data used during web browsing support operations in the server 300. The configuration data may comprise parameters and/or code, which may comprise software and/or firmware, but the configuration data need not be limited in this regard. The host processor 304 may enable execution of applications, programs and/or code, which may be stored in the host memory 306 for example, to enable performing various web browsing support operations.

The system bus 310 may comprise suitable logic, circuitry, code, and/or interfaces that may enable exchange of data and/or information between various components and/or systems in the server 300. In this regard, the system bus may comprise different parallel or serial, and/or internal or external, based bus technologies, and/or any combinations thereof. Exemplary system bus interfaces may comprise Inter-Integrated Circuit ($I^2C$), Universal Serial Bus (USB), Advanced Technology Attachment (ATA), Small Computer System Interface (SCSI), Peripheral Component Interconnect (PCI), and/or Peripheral Component Interconnect Express (PCI-e) based interfaces.

The security system 320 may comprise suitable logic, circuitry, code, and/or interfaces that may perform security related operations in the server 300. In this regard, the security system 320 may ensure secured communications between the server 300 and serviced STBs by providing, for example, user authentication, certificate usage, and/or cryptographic operations.

The interfacing system 330 may comprise suitable logic, circuitry, code, and/or interfaces that may enable communication of data, content, and/or messaging from and/or to the server 300. The interfacing system 330 may support, for example, a plurality of physical and/or logical connections or interfaces. In this regard, the interfacing system 330 may comprise, for example, one or more network interface cards (NIC) and/or wireless network interface cards (WNIC), to support use of wired and/or wireless connections. The interfacing system 330 may comprise, for example, the interfacing processor 332, the interfacing memory 334, and/or the plurality of I/F modules 336a, . . . , 336n. In an exemplary aspect of the invention, the interfacing system 330 may support use of CATV connection, such as the CATV connection 212 of FIG. 2.

The interfacing processor 332 may comprise suitable logic, circuitry, code, and/or interfaces that may enable dedicated control and/or management of processing and/or operations in the interfacing system 330. The interfacing memory 334 may comprise suitable logic, circuitry, and/or code that may enable dedicated storage via the interfacing system 330, to enable, for example, buffering content transmitted to STBs. The interfacing memory 334 may comprise one or more ROM and/or RAM memory devices. Each of the plurality of I/F modules 336a, . . . , 336n may comprise suitable logic, circuitry, code, and/or interfaces that may enable physical transmission and/or reception based on a wired-based or wireless protocols. In an exemplary aspect of the invention, at least one of the plurality of I/F modules 336a, . . . , 336n may support physical transmission and/or reception of signals formatted for communication of CATV broadcasts.

The application processor 340 may comprise suitable logic, circuitry, code, and/or interfaces that may be operable to perform specific applications and/or tasks in the server 300 during STB servicing operations. For example, the application processor 340 may process requests from STBs to handle at least a portion of the content of a web page for subsequent rendering by the STBs. In this regard, the application processor 340 may be operable to convert and/or transcode content from one format into another format, using, for example, a content encoder 350. The content encoder 350 may comprise suitable circuitry, logic, code, and/or interfaces that may be operable to transform data processed by the application processor 340 into format supported by serviced STBs. For example, the application processor 340 may be operable to process plug-ins unsupported by the web browser in the serviced STB(s) and may encode such processed plug-ins with a low latency H.264/ACC encoder. The application processor 340 may comprise a plurality of different encoders that may be utilized to encode different types of contents from a web page into different formats, for example. In some embodiments of invention, the server 300 may comprise a plurality of application processors 340, as indicated by the dashed outlines illustrated in FIG. 3, to enable performing multiple applications and/or tasks concurrently. Accordingly, the server 300 may be operable to support a plurality of STBs, and/or may be operable to provide load balancing and/or load sharing. For example, each of the plurality of application processors 340 may be configured to service a particular STB, to process or handle specific format, and/or perform a specific sub-task that may be necessary during web browsing support operations via the server 300. The application processor 340 may comprise, for example, x86-based architecture that may support processing of certain plug-ins developed or coded for execution in an x86-based processor architecture. The server 300 may also be operable to provide, via the application processor 340, an emulator of the x86-based processor to process certain content unsupported by STBs.

In operation, the server 300 may be used within a CATV based infrastructure to forward CATV broadcasts received from CATV head-ends to targeted subscribers, substantially as described with regard to FIG. 2. The server 300 may also be used to support certain STB operations. For example, the server 300 may support web browsing via STBs by providing, via the application processor 340, content processing corresponding to unsupported portions 170 in a web page 160 that may need be rendered via the STBs, substantially as described with regard to FIGS. 1A and 1B. Furthermore, during communication of processed content, the security system 230 may provide security during interactions between the server 300 and the serviced STBs and/or web servers, to ensure, for example, that content intended for specific users is not compromised and/or accessed by unauthorized users.

In an exemplary aspect of the invention, at least some of the content processed via the server 300 may also be transported via broadcast based links, such as CATV connections, supported via the interfacing system 330, substantially as described with regard to FIG. 2. In this regard, the interfacing system 330, for example, may be configured to enable piggybacking of the processed content on, for example, CATV connections using available bandwidth in these connections. To further enhance operations of the server 300, bandwidth may be freed and/or made available in broadcast based links, by reconfiguring one or more of the plurality of I/F modules 336a, . . . , 336n, to increase the size and/or transport bitrate of processed content during servicing of STBs. In this regard, switched digital video (SDV) may be used, via the host processor 304 in the server 300 for example, to allow freeing bandwidth corresponding to, for example, unused, unwatched, and/or are infrequently viewed channels by removing these channels from the typical CATV broadcast forwarded via interfacing system 330 of the server 300. Similarly, dedicated IPTV channels and/or systems may be used via the server 300, substantially in similar manner, to free bandwidth in connections which are utilized to communicate IPTV broadcasts to the STBs via the server 300 to support dynamic encoding of content and/or delivery of that content to serviced STBs via the server 300 during support of web access by the STBs.

The freed bandwidth then may be utilized to communicate processed content during servicing of STB web access operations to the target STBs. In this regard, bandwidth that would have otherwise been allocated in CATV connections for unwatched and/or infrequently watched channels may instead be used, by the host processor 304 and/or the interfacing system 330, to transport content processed via the application processor 340. For example, one or more of the plurality of I/F modules 336a, . . . , 336n may be configured, by the host processor 304 and/or the interfacing processor 332, to support transporting processed content via broadcast based links. In some instances, the bandwidth freed in such CATV connections for transporting the processed content may be allocated, by the host processor 304, as dedicated channels such that only each channel may be assigned to a specific STB. In this regard, built in functionality that support similar connectivity in CATV broadcasts (e.g., pay-per-view) may be utilized to ensure that only the target STB is able to receive the processed content. In other instances, the freed bandwidth may be used to enable multicast transport of processed content, to a set of STBs, by assigning the freed bandwidth, for example, to one or more channels that may be accessed based on some logical group identifier. Availability of bandwidth via the broadcast links may be used to configure various components and/or operations within the server 300. For example, encoding operations, performed via the content encoder 350 for example, may be configured based on availability of bandwidth, and size thereof, in broadcast links.

The server 300 may also utilize, via the host processor 304, SDV based switching techniques to enable switching processed content, which may be generating by the application processor 340 as encoded A/V streams, into existing CATV channels. For example, if the processed content comprises VP6 encoded content that content may be switched into existing CATV channels that may be MPEG-2 or MPEG-4 AVC encoded using existing support infrastructure that is otherwise utilized to support dual-carry services in SDV based systems. The server 300 may also enable uplink connectivity over CATV connection supported via the interfacing system 330 during web access operations in serviced STBs. In this regard, existing CATV based uplink channels, that may be used to enable communicating CATV subscribers' inputs and/or requests, may be utilized to facilitate communicating user input and/or request in the web access operations initiated via the STBs. Alternatively, the uplink connectivity may be provided over separate and dedicated broadband connection, supported via the server 300 or other servers.

The server 300 may monitor CAW related activities in connections supported via the interfacing system 330 to determine, for example, if more bandwidth may be freed and/or some of the already freed bandwidth may be reallocated and utilized for CAW broadcast forwarding. In this regard, the host processor 304 and/or the interfacing processor 332 may reconfigure one or more the plurality of I/F modules 336a, . . . , 336n based on monitoring of broadcast access by STBs that receive broadcast forwarding services via the server 300. Furthermore, changes in the amount of bandwidth available and/or freed may be used to adjust and/or reconfigure encoding operations, performed via the content encoder 350 for example, to ensure that the size of generated output streams may be suitable for transport based on available bandwidth.

Figure 4:
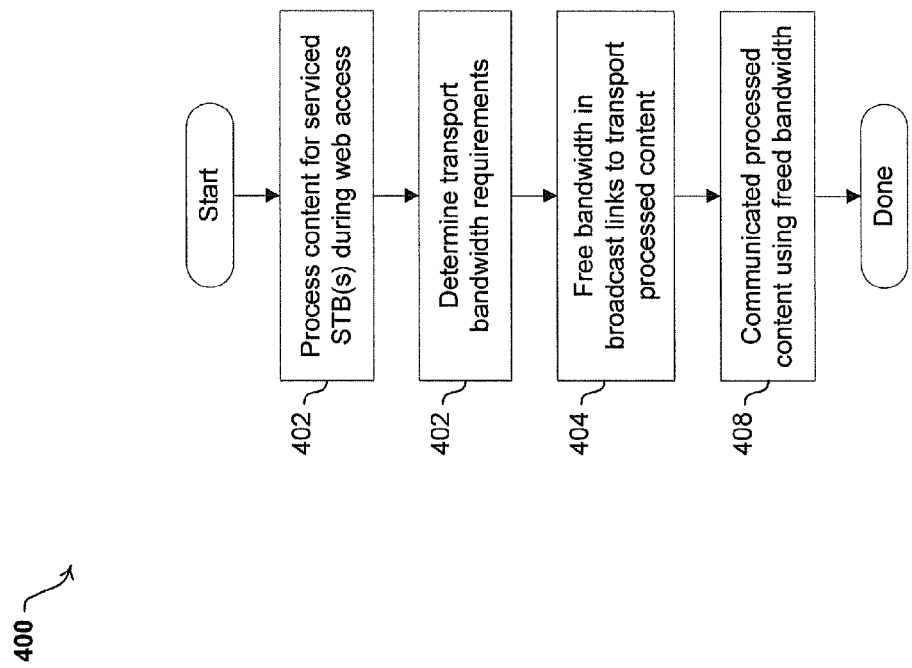
FIG. 4 is a flow chart that illustrates exemplary steps for using switched digital video (SDV) for delivering dynamically encoded video content during web browsing via a set-top-box (STB), in accordance with an embodiment of the invention.

FIG. 4 is a flow chart that illustrates exemplary steps for using switched digital video (SDV) for delivering dynamically encoded video content during web browsing via a set-top-box (STB), in accordance with an embodiment of the invention. Referring to FIG. 4, there is shown a flow chart 400 comprising a plurality of exemplary steps that may be performed to enable utilizing SDV during communications of processed content from a server.

In step 402, a server, such as the server 300, may service a STB providing web access by processing content that may require unsupported plug-ins. In step 404, bandwidth required for transporting the processed content may be determined. In step 406, bandwidth in broadcast links that are used in the server 300 for forwarding, for example, CATV and/or IPTV broadcasts, may be freed using, for example, switched digital video (SDV) and/or dedicated IPTV channels or systems. In step 408, at least a portion of the processed content may be communicated to the serviced STB(s) using the free bandwidth and/or SDV.

Various embodiments of the invention may comprise a method and system for utilizing Switched Digital Video (SDV) for delivering dynamically encoded video content. The server 300 may be used to handle at least some processing of content that is based on web access operations in the STBs, such as one or more of the plurality of STBs 200a, 200b, . . . , 200n. In this regard, one or more of the broadcast links that may be supported via the interfacing system 330 in the server 300, for forwarding multimedia broadcasts, may be configured to free bandwidth for communicating at least a portion of the processed content. Exemplary multimedia broadcasts comprise cable television (CATV) broadcasts and Internet Protocol television (IPTV) broadcasts. The processing handled in the server 300 may comprise converting content that is unsupported via the serviced STB to video content that is supported by that STB. The bandwidth may be freed based on switched digital video (SDV), and at least a portion of the freed bandwidth may correspond to unwatched and/or infrequently watched channels in the multimedia broadcasts communicated via the broadcast links using the switched digital video (SDV) techniques. Bandwidth may also be freed utilizing dedicated IPTV channels and/or systems. The broadcast links may be reconfigured, by the host processor 304 and/or the interfacing processor 332, based on monitoring of broadcast access operations by STBs receiving broadcasts communications via the server 300. Resources and/or applications used by the server 300 to handle content from web initiated browsing in the STB may be configured based on the configuration of the broadcast links. Furthermore, at least some of those resources and/or applications may be reconfigured based on changes in freed bandwidth in the broadcast links.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for utilizing Switched Digital Video (SDV) for delivering dynamically encoded video content.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
receiving, by a server having one or more processors and configured to handle processing of Internet content for a set-top box (STB), a request for Internet content from the STB;
in response to the received request for Internet content, configuring, by the server, one or more links between the server and the STB by removing one or more unwatched or infrequently watched channels from a pool of available channels to free bandwidth in the one or more links for communicating the requested Internet content to the STB, wherein the one or more links are utilized during multimedia broadcasts to the STB via the server; and
in response to the received request for Internet content, communicating, by the server, at least a portion of the Internet content generated by the server based on the processing of the Internet content to the STB using the freed bandwidth.

2. The method according to claim 1, wherein the processing of the content comprises converting content that is unsupported by the STB to video content supported by the STB.

3. The method according to claim 1, wherein the multimedia broadcasts comprise cable television (CATV) and/or Internet Protocol television (IPTV) broadcasts.

4. The method according to claim 1, comprising determining at least some of the freed bandwidth using switched digital video (SDV).

5. The method according to claim 1, comprising reconfiguring the one or more links based on monitoring of multimedia broadcast access by the STB and/or one or more other STBs via the one or more links.

6. The method according to claim 1, comprising configuring resources and/or applications used in the server during the processing of the content based on the configuring of the one or more links.

7. The method according to claim 6, comprising reconfiguring the resources and/or applications in the server based on changes in freed bandwidth in the one or more links.

8. The method according to claim 6, wherein at least some of the resources and/or applications are configured to encode video content generated based on the processing.

9. The method according to claim 8, comprising dynamically modifying the video content encoding based on changes in the freed bandwidth in the one or more links.

10. A system for communication, the system comprising:
one or more processors and/or circuits for use in a server configured to handle processing of Internet content for a set-top box (STB), wherein the Internet content is derived from STB initiated Internet access, the one or more processors and/or circuits configured to:
receive a request for Internet content from the STB;
in response to the received request for Internet content, configure one or more links between the server and the STB by removing one or more unwatched or infrequently watched channels from a pool of available channels to free bandwidth in the one or more links for communicating the requested Internet content to the STB, wherein the one or more links are utilized during multimedia broadcasts to the STB via the server; and
in response to the received request for Internet content, communicate at least a portion of the Internet content generated by the server based on the processing of the Internet content to the STB using the freed bandwidth.

11. The system according to claim 10, wherein the processing of the content comprises converting content that is unsupported by the STB to video content supported by the STB.

12. The system according to claim 10, wherein the multimedia broadcasts comprise cable television (CATV) and/or Internet Protocol television (IPTV) broadcasts.

13. The system according to claim 10, wherein the one or more processors and/or circuits are configured to determine at least some of the freed bandwidth using switched digital video (SDV).

14. The system according to claim 10, wherein the one or more processors and/or circuits are operable to reconfigure the one or more links based on monitoring of multimedia broadcast access by the STB and/or one or more other STBs via the one or more links.

15. The system according to claim 10, wherein the one or more processors and/or circuits are operable to configure resources and/or applications used in the server during the processing of the content based on the configuring of the one or more links.

16. The system according to claim 15, wherein the one or more processors and/or circuits are operable to reconfigure the resources and/or applications in the server based on changes in freed bandwidth in the one or more links.

17. The system according to claim 15, wherein the one or more processors and/or circuits are operable to dynamically modify the video content encoding based on changes in the freed bandwidth in the one or more links.

18. A non-transitory computer-readable storage medium having stored thereon computer code causing a server to handle processing of Internet content for a set-top box (STB), wherein the Internet content is derived from STB initiated Internet access method for communication, the processing comprising:
receiving a request for Internet content from the STB;
in response to the received request for Internet content, configuring one or more links between the server and the STB by removing one or more unwatched or infrequently watched channels from a pool of available channels to free bandwidth in the one or more links for communicating the requested Internet content to the STB, wherein the one or more links are utilized during multimedia broadcasts to the STB via the server; and
in response to the received request for Internet content, communicating at least a portion of the Internet content generated by the server based on the processing of the Internet content to the STB using the freed bandwidth.

19. The method according to claim 1, wherein the portion of the Internet content is communicated to the STB by unicast transmission.

20. The method according to claim 1, wherein the portion of the Internet content is communicated to the STB and at least another STB by multicast transmission using a logical group identifier.

* * * * *

UNITED STATES PATENT AND TRADEMARK OFFICE
CERTIFICATE OF CORRECTION

PATENT NO. : 9,294,791 B2
APPLICATION NO. : 12/650069
DATED : March 22, 2016
INVENTOR(S) : Xuemin Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 677 days.

Signed and Sealed this
Twenty-eighth Day of June, 2016

Michelle K. Lee
*Director of the United States Patent and Trademark Office*